(12) United States Patent
Sorenson et al.

(10) Patent No.: US 6,714,598 B2
(45) Date of Patent: Mar. 30, 2004

(54) BURST-MODE COMBINING OF REVERSE PATH RADIO FREQUENCY SIGNALS

(75) Inventors: Donald C. Sorenson, Lawrenceville, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/134,668

(22) Filed: Apr. 29, 2002

(65) Prior Publication Data

US 2003/0202613 A1 Oct. 30, 2003

(51) Int. Cl.[7] .......................... H04L 25/03; H04B 10/04
(52) U.S. Cl. ...................... 375/296; 375/285; 375/346; 398/182
(58) Field of Search ................................ 375/219, 222, 375/260, 285, 316, 346, 349, 350, 295, 296; 725/106, 117, 119, 121, 122, 124, 125, 126, 129; 398/182; 370/485, 486, 487, 522, 524

(56) References Cited

U.S. PATENT DOCUMENTS

| | | | | |
|---|---|---|---|---|
| 3,924,187 A | | 12/1975 | Dormans | 325/52 |
| 4,118,669 A | | 10/1978 | Fung | 325/309 |
| 5,719,872 A | * | 2/1998 | Dubberly et al. | 370/487 |
| 5,939,887 A | * | 8/1999 | Schmidt et al. | 324/628 |
| H1858 H | | 9/2000 | Ibelings | 348/12 |
| 6,425,132 B1 | * | 7/2002 | Chappell | 725/107 |
| 6,509,994 B2 | * | 1/2003 | West, Jr. | 398/192 |
| 6,559,756 B2 | * | 5/2003 | Al-Araji et al. | 340/286.01 |
| 2003/0096586 A1 | * | 5/2003 | Oates et al. | 455/226.1 |

FOREIGN PATENT DOCUMENTS

| EP | 0549129 | 6/1993 |
|---|---|---|
| EP | 0859514 | 8/1998 |
| WO | WO 01/45412 | 6/2001 |
| WO | WO 01/62003 | 8/2001 |

\* cited by examiner

*Primary Examiner*—Chieh M. Fan (57) ABSTRACT

The present invention is directed towards a burst-mode combiner (BMC) typically located within a headend facility for transmitting received reverse signals to a specific application device dependent upon the presence of a carrier signal. The BMC includes BMC circuits that are each coupled to reverse receivers. The BMC circuits filter the reverse signals into specific frequencies. A carrier detect circuit detects the presence of a carrier signal, and when detected, allows the delayed reverse signals to be transmitted through to the application device.

5 Claims, 6 Drawing Sheets

Fig. 1
(Prior Art)

(Prior Art)

BURST-MODE COMBINING OF REVERSE PATH RADIO FREQUENCY SIGNALS

FIELD OF THE INVENTION

This invention relates generally to broadband communications systems, such as cable television systems, and more specifically to burst-mode combining of reverse path radio frequency (RF) signals that are generated in the broadband communications systems.

BACKGROUND OF THE INVENTION

Figure 1:
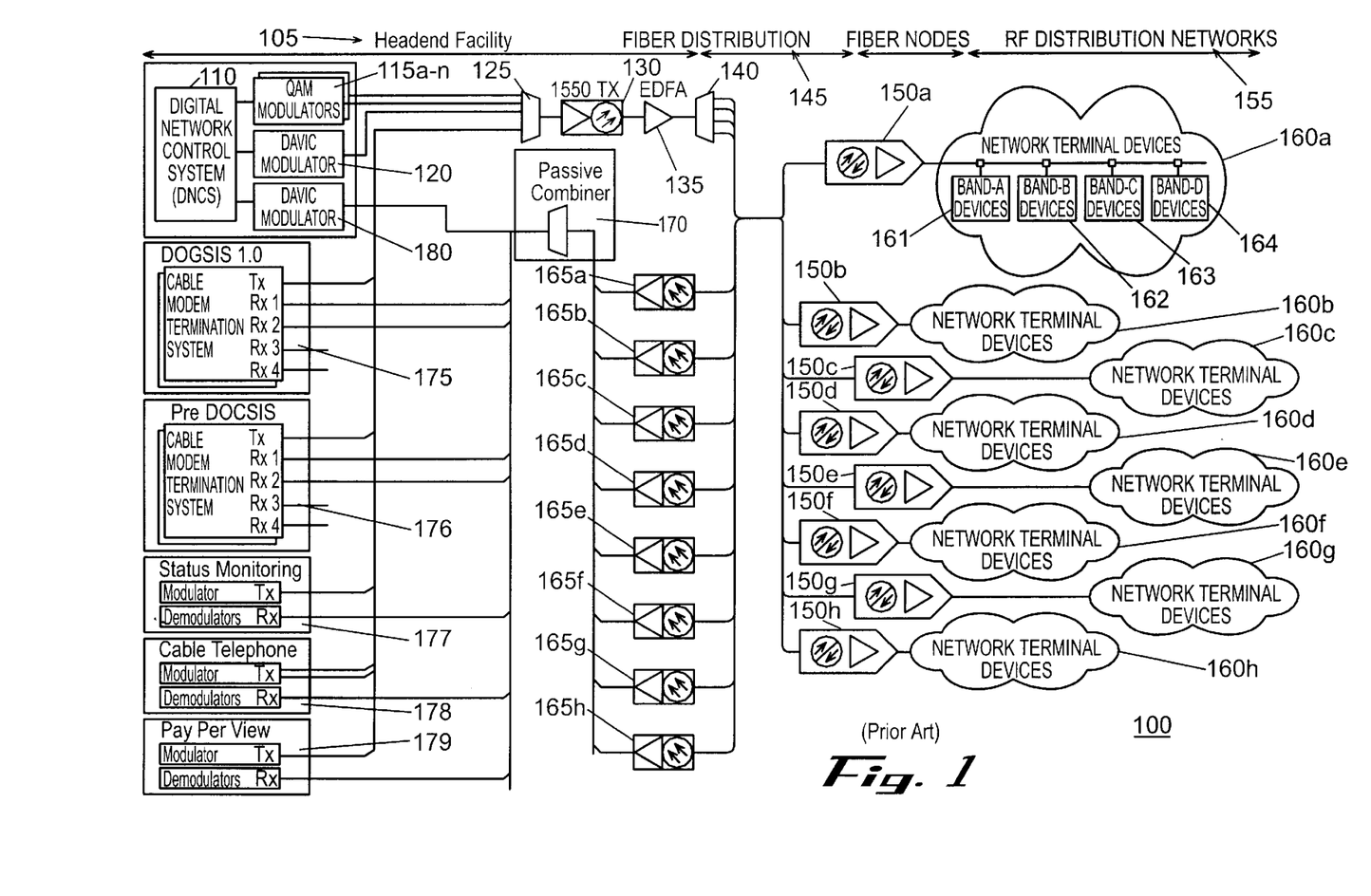
FIG. 1 is a block diagram illustrating an example of a conventional broadband communications system, such as a two-way hybrid fiber/coaxial (HFC) communications system, that carries optical and electrical signals.

FIG. 1 is a block diagram illustrating an example of a conventional broadband communications system 100, such as a two-way hybrid fiber/coaxial (HFC) communications system, that carries optical and electrical signals. Such a system may be used in a variety of networks, including, for example, a cable television network; a voice delivery network; and a data delivery network to name but a few. The communications system 100 includes a headend facility 105 for generating forward, or downstream, radio frequency (RF) signals (e.g., video, voice, or data signals) that are transmitted in a forward frequency band. A typical forward frequency band ranges from 50 Mega Hertz (MHz) to 860 MHz. Numerous application devices 110, 175, 176, 177, 178, 179 located within the headend facility 105 generate the forward RF signals. For example, a digital network control system (DNCS) 110 controls the routing of digital video broadcast signals and provides the signals to, for example, quadrature amplitude modulation (QAM) modulators 115a–n and/or digital audio/visual council (DAVIC) modulators 120 that modulate the signals with a desired forward carrier signal. A combiner 125 combines the modulated RF signals with other modulated signals being supplied from other modulators and provides the signals to a broadcast optical transmitter 130. In a known conventional manner, the broadcast optical transmitter 130 first converts the signals to an optical signal and an erbium-doped fiber amplifier (EDFA) 135 then amplifies the optical signal. A splitter 140 then splits the optical signal for transmission downstream through a long haul fiber distribution network 145.

A forward optical receiver (FORU) (not shown) that is included in each of a plurality of fiber nodes 150a–h receives the split optical signal and converts the signal back to RF signals in a known manner. The RF signals are then routed through an RF distribution network 155 for delivery to connected network terminal devices 160a–h. It will be appreciated that the network terminal devices 160a–h can be a variety of different communication devices that are tuned to receive the broadcast RF signals at specific forward frequencies. By way of example, device 161 may be a cable modem tuned to receive signals that include DOCSIS cable modem termination system (CMTS) signals; device 162 may also be a cable modem tuned to receive signals that include pre-DOCSIS CMTS signals; device 163 may be a status monitoring device that receives status monitoring signals; and device 164 may be a telephone that receives cable telephone signals, to name but a few.

Figure 2:
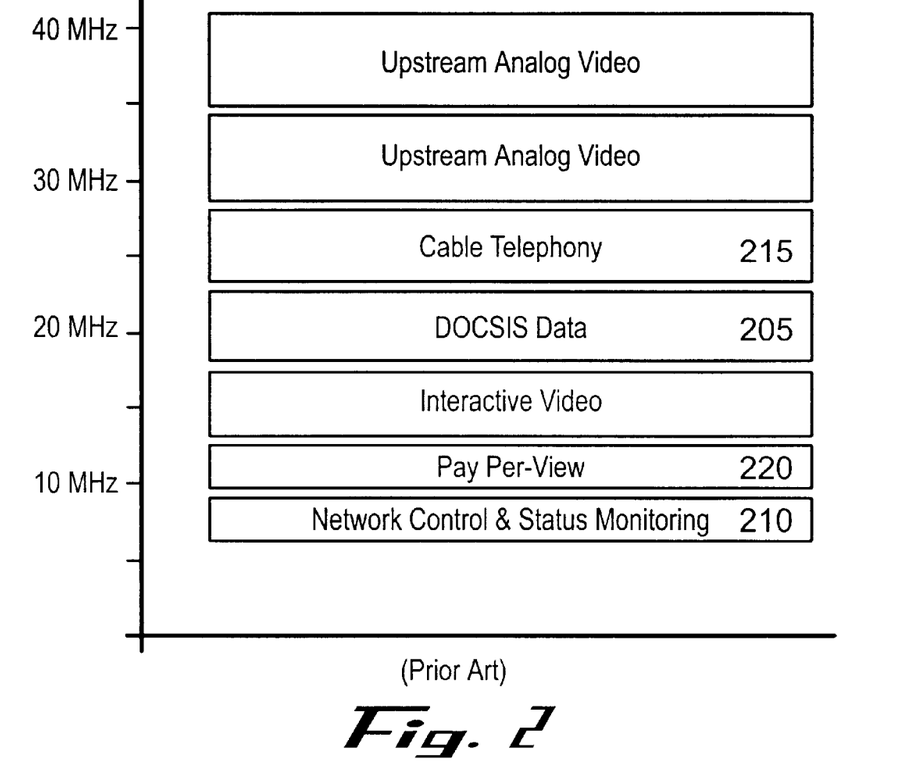
FIG. 2 illustrates a typical reverse band and the frequencies allocated to various services that may be used by the network terminal devices for the purpose of sending reverse carrier signals.

In the reverse frequency band, which typically ranges from 5 MHz to 42 MHz, electrical signals are provided from the network terminal devices 160a–h to the headend facility 105 through the RF and fiber distribution networks 155, 145. Periodically, the network terminal devices 160a–h each sends reverse carrier signals in predetermined reverse frequency bands to the application devices. It will be appreciated, however, that these reverse carrier signals are not sent by the network terminal devices 160a–h at all times. This periodic transmission of carrier signals is colloquially known in the art as "burst mode" transmissions. Moreover, the normal functioning and protocol of each application device 110, 175–179 controls the timing of the reverse carrier signals. For example, the DNCS 110 allows one set-top device to transmit signals at a specific frequency at a specific time and, when provided, receives the reverse carrier signal from the set-top device via DAVIC modulator 180. This conventional reverse protocol insures that there is no ambiguity by the application devices 110, 175–179 as it receives signals from the plurality of network terminal devices 160a–h. FIG. 2 illustrates a typical reverse band and the frequencies allocated to various services that may be used by the network terminal devices 160a–h for the purpose of sending reverse carrier signals.

Unfortunately, however, in addition to the desired reverse carrier signals that are sent through the networks 155, 145, unwanted noise signals also enter the RF distribution network 155 by numerous means and conditions. A large portion of the unwanted noise signals enter the system through, for example, defective connectors, poorly shielded cable, and other cable components located at the subscriber location or throughout the RF distribution of the network 155. Consequently, these unwanted noise signals degrade the ability of the respective application device 110, 175–179 to effectively process the desired reverse carrier signals.

A reverse optical transmitter (ROTU) (not shown) is also included in each of the plurality of fiber nodes 150a–h. The ROTU converts the reverse RF signal(s), which includes both the carrier signals and the noise signals, to an optical signal and provides the optical signal via the fiber distribution network 145 to a corresponding reverse optical receiver (RORU)165a–h. It will be appreciated that separate reverse fiber paths (not shown) are routed between each of the reverse optical transmitters (ROTUs) and the respective reverse optical receiver (RORU) 165a–h. Typically, this is required because reverse optical signals of the same wavelength cannot conventionally be combined and, therefore, require a direct fiber link between an optical transmitter to an optical receiver in the reverse path.

The RORUs 165a–h each convert the optical signals back to electrical signals in a conventional manner. The reverse signals provided by each of the RORUs 165a–h are then electrically combined through passive combiner 170. Application devices 110, 175–179 are tuned to a specific reverse frequency band (e.g., 205, 210, 215, 220 (FIG. 2)) in order to receive just the desired portion of the combined reverse signals, which includes the desired carrier signal(s). By way of example, a DOCSIS CMTS 175 may be tuned to receive carrier signals within reverse frequency band 205, a status monitoring device 177 may be tuned to receive carrier signals within reverse frequency band 210, a cable telephone device 178 may be tuned to receive carrier signals within reverse frequency band 215, and a pay-per-view device 179 may be tuned to receive carrier signals within frequency band 220. Commonly eight to ten independent application devices offering specific services utilize the return frequency band. Each of these applications orchestrates the timing of their associated network terminal device (e.g., 160a–h) such that only one network terminal device transmits within the application's return frequency band at a time. This orchestration of singular transmission within a reverse frequency band may also be used to orchestrate the behavior of elements that are or are not the linking application to its targeted network terminal device.

Unfortunately, as mentioned, noise signals, also referred to as ingress signals, can enter the system at any time and travel to the headend facility 105, regardless of whether or not a desired reverse carrier signal is being transmitted. Once ingress signals are present in the system, the ingress signals are transmitted back through the HFC reverse path along with any desired carrier signal(s). Of particular concern is the fact that the undesired ingress signals from multiple premises tend to be combined through the system and, therefore, to build in relative amplitude. The aggregate of these undesired ingress signals could pose a considerable threat to the ability of the system to successfully transmit and process the desired carrier signals. More specifically, after conversion back to electrical signals, the ingress signals and the desired carrier signals are combined with other reverse signals transmitted by the RORUs 165a–h via the passive combiner 170. As a result, ingress signals delivered from each of the RORUs 165a–h that have been combined into one reverse signal reduces the desired carrier to noise signal strength ratio (CNR). A low CNR can effectively render the desired carrier signals useless or force the operator to use signal encoding methods that are slower, but may be more immune to the effects of noise. Additionally, it is known that the RORUs 165a–h each output signals in the entire reverse signal band at all times to facilitate the instantaneous receipt of a carrier signal from any one of the connected network terminal devices 160a–h. Consequently, ingress signals that have entered the system are being continuously transmitted from each of the RORUs 165a–h to the combiner 170 at all times.

What is needed, therefore, is a device that selectively blocks the output signals of each individual RORU 165a–h prior to combining the output signals, unless the RORU 165a–h is outputting a desired reverse carrier signal. In this manner, performance that is adversely affected by the aggregate ingress signals can be improved by mitigating a portion or all of the unwanted ingress signals. More specifically, such a device would limit ingress signals reaching the target application device to that of just the RORUs 165a–h that are transmitting a carrier signal(s) rather than the additive condition previously described. By blocking the unwanted ingress noise from the RORUs 165a–h that are not transmitting a reverse carrier signal, the CNR related to transmitted reverse carrier signals is significantly improved resulting in a more robust or enhanced operation of the targeted application device.

BRIEF DESCRIPTION OF THE DRAWINGS

FIG. 3 is a block diagram illustrating an example of a broadband communications system including a burst-mode combiner in accordance with the present invention.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. For example, the present invention is detailed and explained relative to the reverse path of a communications system; however, the present invention is not limited to reverse signals. Furthermore, the reverse signals are typically data signals, but these signals could also include additional forms of signals. The present invention is described more fully hereinbelow.

FIG. 3 is a block diagram illustrating an example of a broadband communications system including a burst-mode combiner (BMC) in accordance with the present invention. The BMC 305 combines and transmits the reverse signals provided by at least one RORU 165a–h only when a carrier signal(s) is present at the RORU 165a–h output. It will be appreciated that the reverse signals may include noise signals and carrier signals. More specifically, a network terminal device 160a–h transmits a carrier signal to a coupled RORU 165a–h. The network terminal device's associated application (e.g., 110, 175–179) controls the timing of transmissions such that only one network terminal device within the distribution network 155 transmits at a time on a given return carrier frequency. The BMC 305 detects the presence of the carrier signal that is provided by the RORU 165a–h and only then allows the reverse signals from the particular RORU 165a–h that links a network application to its targeted network terminal device to be passed through to the application device's return signal input. All other reverse signals from the remaining RORUs 165a–h that do not link an application to its targeted network terminal device are blocked by the BMC 305. Thus, on a moment-by-moment basis the application device's RF input receives only the signal and noise from one RORU at a time. It will be appreciated that more than one RORU 165a–h can transmit at least one carrier signal at the same time, however, in most cases, the carriers will not be common to the frequency being tuned by the application device's input. Typically, other simultaneous carriers will be on other frequencies and associated with other applications (e.g., 110, 175–179). Accordingly, the BMC 305 selects the RORU 165a–h output, which includes the carrier signal, and passes the signal along with the associated RORU's noise to their intended application device. In this manner, a primary advantage of the present invention is lowering the combined CNR received at an application device, thereby significantly improving the signal processing performed by that device.

As mentioned, included in FIG. 3 is a conventional reverse optical transmitter (ROTU) (not shown) that is typically located within each of the fiber nodes 150a–h. The ROTU receives a carrier signal from at least one coupled network terminal device 160a–h and converts the received signal to an optical signal in a known manner. A corresponding RORU 165a–h receives the optical signal and converts the signal back to an electrical signal in a conventional manner. The RORU 165a–h then provides the electrical signal to the BMC 305 for carrier detection. Accordingly, the BMC 305 utilizes a "burst-mode" technique that only allows reverse signals through to the application devices from the RORU 165a–h when a specific reverse "burst-mode" carrier signal is present in the associated application's return RF spectrum as illustrated in FIG. 2.

By way of example, the broadband communications system of FIG. 3 implements 8:1 reverse combining, i.e., combining the outputs of eight RORUs 165a–h. By virtue of the additive effects of RF combining, the noise level presented to each of the application devices 110, 175–179 using a conventional passive combiner 170 (FIG. 1) is approximately 8 times the noise level measured at each of the individual RORUs 165a–h. In contrast, the BMC 305, according to the present invention, selectively combines the reverse signal (including noise signals) from the one RORU 165a–h that is transmitting a carrier signal within the application's band of operation and then provides the signal to the targeted application device. Notably, the targeted application device only receives one-eighth of the noise signals that it would have received conventionally, assuming there are eight RORUs 165a–h and one RORU transmitting a carrier signal. This results in a significant improvement in CNR. It will be appreciated that the number of all of these devices can be changed to reflect the design of the broadband communications system 300, for example, a lesser or greater number of optical transmitters and optical receivers can be used.

Figure 4:
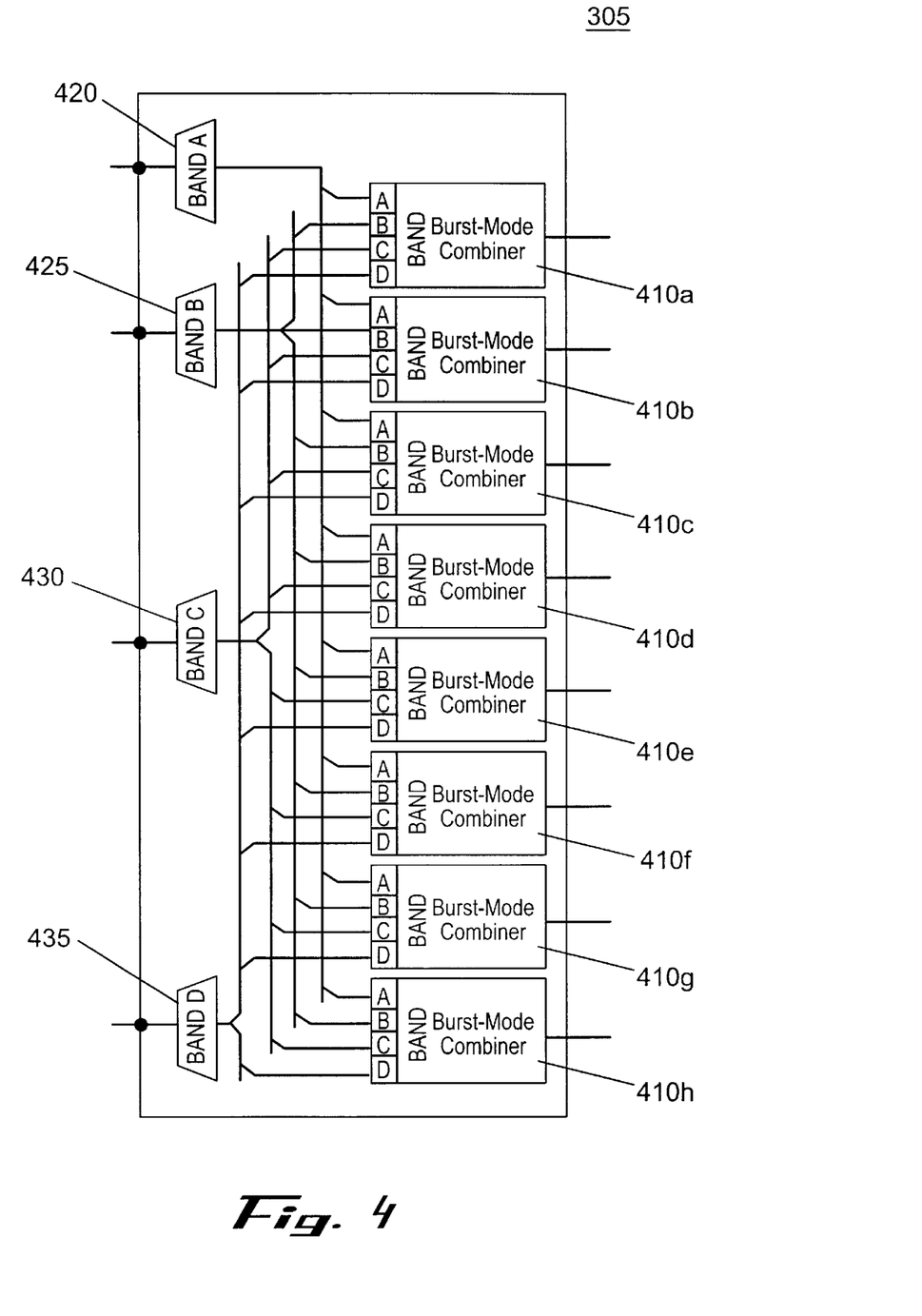
FIG. 4 is a block diagram illustrating the burst-mode combiner (BMC) of FIG. 3 in accordance with the present invention.

FIG. 4 illustrates the burst-mode combiner (BMC) 305 of FIG. 3 in accordance with the present invention. Included in the BMC 305 and coupled to each RORU 165a–h is a burst-mode combiner (BMC) circuit 410a–h. As previously mentioned, each of the RORUs 165a–h transmits reverse signals at all times, which also includes carrier signals when transmitted and ingress signals when they enter the system and, therefore, continuously provides reverse signals to the coupled BMC circuit 410a–h. In other words, each of the RORUs 165a–h provides the full return spectrum of application return signals at all times.

Each BMC circuit 410a–h detects the presence of a carrier signal within an application's designated return frequency band and, when present, routes the reverse signals to the application device's return input. The BMC 305 is configured to support, for example, four reverse frequency bands (for example, 205, 210, 215, 220 as shown in FIG. 2) that are each directed to a specific application device. Thus, in this example, each BMC circuit 410a–h includes four individual detection circuits where each detection circuit filters the predetermined frequency band. Each individual detection circuit is then combined with the other BMC circuits 410a–h by frequency band to provide the combined carrier signal(s) to the target application devices via passive combiners 420, 425, 430, 435.

More specifically, the BMC circuits 410a–h each include a predetermined number of bandpass filters depending upon the number of frequency bands to be combined using the BMC 305. In the example shown in FIG. 4, there are four output ports (A, B, C, D) included in each BMC circuit 410a–h that is determined by four reverse frequency bands ($A_r, B_r, C_r, D_r$) that the network terminal devices will utilize when transmitting carrier signals. These four frequency bands are to be selectively combined via the BMC 305 It will be appreciated that additional individual detection circuits and output ports can be included in each BMC circuit 410a–h as required.

Figure 5:
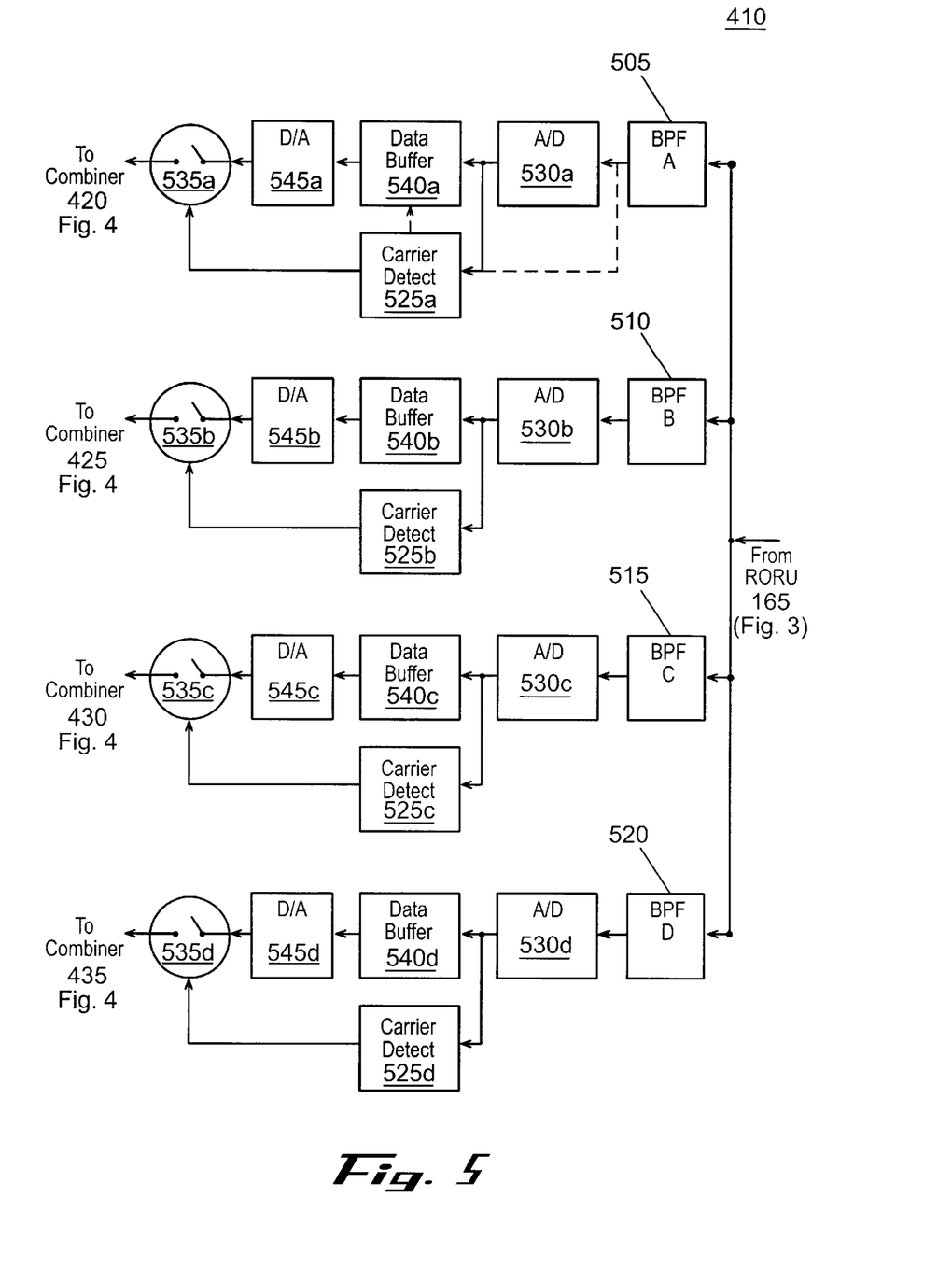
FIG. 5 further details a block diagram of a BMC circuit and the individual detection circuits in accordance with the present invention that is included in the BMC of FIG. 4.

FIG. 5 further details a block diagram of a BMC circuit 410 and the individual detection circuits in accordance with the present invention that is included in the BMC 305. In this illustration, the reverse signals from one RORU 165 (FIG. 3) are provided to one coupled BMC circuit 410. Bandpass filters (BPFs) 505, 510, 515, 520 filter the desired reverse signals from the received total reverse signals. The center bandpass frequency for each of the input BPFs 505, 510, 515, 520 is tuned to the desired portion of the reverse frequency band for the predetermined reverse carrier signal frequency that is intended for one of the targeted application devices 110, 175–179. Accordingly, the BPFs 505–520 reject other reverse signals and any ingress signals that are outside of their bandpass range.

The presence of a carrier signal is detected via an analog carrier detect circuit 525a–d after the filtered reverse signal passes through one of the BPFs. The analog carrier detect circuit 525a–d may be implemented using a comparator that compares a reference value with the composite voltage or power level of any incoming reverse signals. In the preferred embodiment, the reverse signal is digitized, prior to carrier signal detection, with an analog-to-digital (A/D) converter 530a–d and, subsequently, detected via a digital carrier detect circuit 525a–d. The digital carrier detect circuit 525a–d may be implemented using a low-cost digital format that includes a few gates and counters. When a carrier signal(s) is detected, the carrier detect circuit 525a–d controls a switch 535a–d, thereby allowing a path for the output reverse signals to be provided to a coupled combiner 420, 425, 430, 435 (FIG. 4). Alternatively, the carrier detect circuit 525a–d enables a digital-to-analog (D/A) converter 545a–d to output the reverse signals that are delayed by data buffer 540a–d.

After the reverse signals have been digitized, the digital signals are provided to the data buffer 540a–d, which may be implemented using a low-cost digital delay circuit, such as registers or random access memory (RAM). The data buffer 540a–d is provided because it takes a period of time for the carrier detect circuit 525a–d to detect the presence of a carrier signal(s). The data buffer 540a–d, therefore, ensures the transmission of the entire reverse signal by delaying the reverse signal sufficiently to allow the carrier detect circuit 525a–d to detect the carrier signal(s) and close the switch 535a–d or enable the D/A converter output. The reverse signals are then converted back to analog signals with the D/A converter 545a–d. If the switch 535a–d has been closed or the reverse signals allowed to pass from the data buffer 540a–d through to the D/A converter 545a–d via the carrier detect 525a–d, the reverse signals are further transmitted to the coupled combiner 420, 425, 430, 435. Another embodiment of the present invention would be to eliminate the A/D and D/A converters. In this case, an analog data buffer would be used rather than the digital data buffer 540a–d. In summary, a preferred embodiment of the present invention digitizes and buffers the reverse signals and implements a carrier signal detection function that gates the output of each of the BMC circuits 410a–h on and off. It will be appreciated that although four bandpass filters are shown in FIG. 4, more or less filters may be utilized depending upon the number of application devices that have been determined to be combined utilizing the BMC circuits 410a–h.

Figure 6:
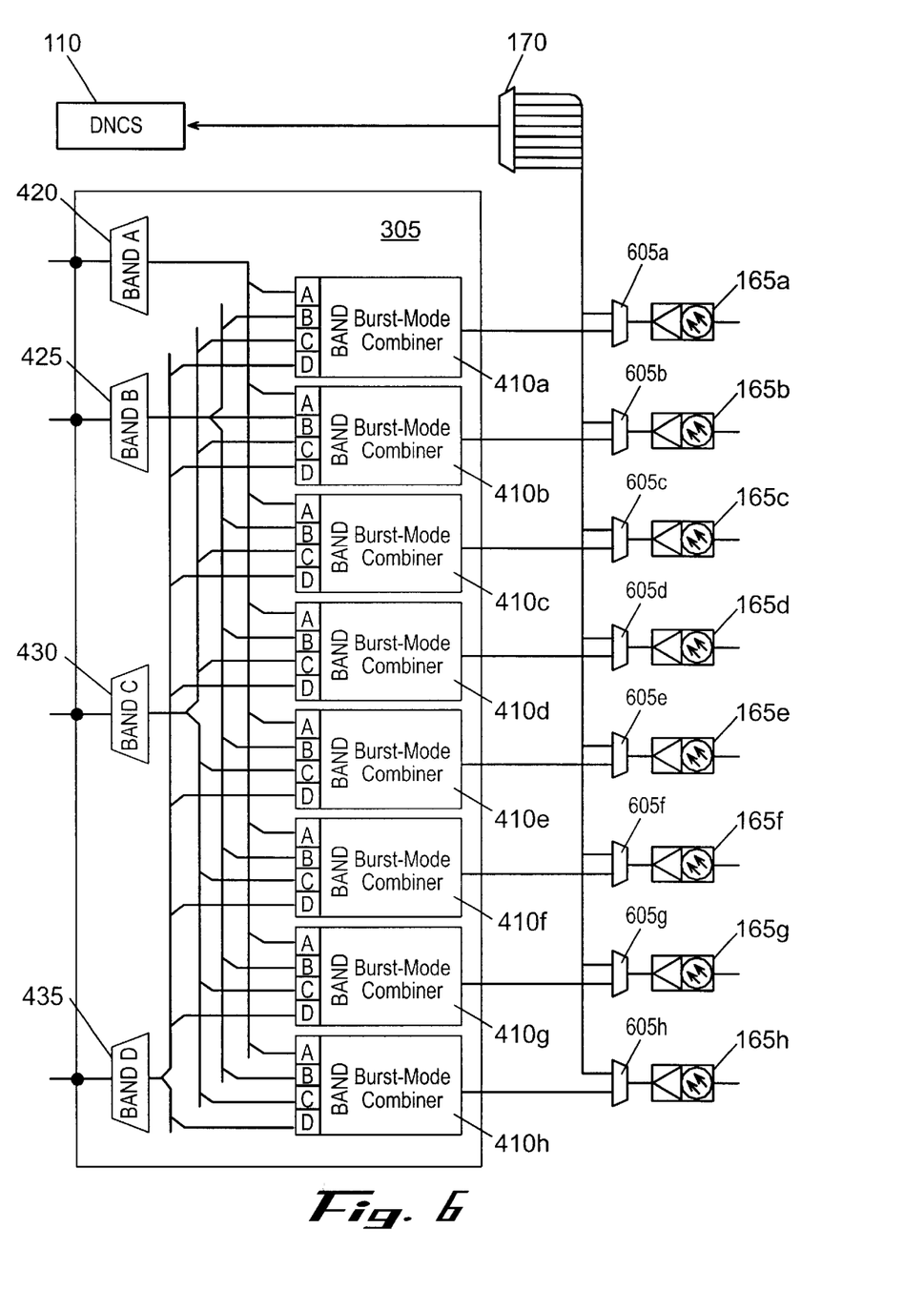
FIG. 6 is a block diagram illustrating a burst-mode combiner in accordance with the present invention along with a passive combiner.

FIG. 6 is a block diagram illustrating a burst-mode combiner 305 in accordance with the present invention along with a passive combiner 170. The passive combiner 170 may also be included when an operator is not as concerned about the CNR level affecting some application devices. For example, the DNCS is not as susceptible to the CNR level as opposed to the CMTS, which tends to be more susceptible. In this case, the passive combiner 170 can optionally be included along with the BMC 305 for combining all the reverse carrier signals from the RORUs 165a–h and transmitting the reverse signals to the intended application device. Splitters 605a–h split the signals received from the RORUs 165a–h and provide a portion to the combiner 170 and a portion to each BMC circuit 410*a–h*. The combiners 420, 425, 430, 435 subsequently combine the reverse signals from each BMC circuit 410*a–h* that has detected a carrier signal and then provides the combined reverse signals directly to the intended application devices that are chosen for burst-mode combining.

The amount of CNR improvement varies depending on several factors. For example, the improvement is more significant when more than one fiber node 150*a–h* (FIG. 3) reverse path is being combined by the BMC 305, i.e., combining the outputs of more than one RORU 165. Additionally, the amount of noise picked up or generated by each individual fiber node 150*a–h* varies. More specifically, system conditions unique to each fiber node 150*a–h* may result in more or less noise being individually sent up to the RORUs 165*a–h*. Since each carrier signal is associated with a unique application device (110, 175, 176, 177, 178, 179) input placement of multiple overlapping or adjacent carriers within a BMC BPF 505, 510, 515, 520 will occasionally result in more than one BMC circuits 410*a–h* switched on at once thus increasing the aggregate noise level, thereby lowering the CNR improvement.

In summary, the BMC 305 is an effective device in lowering the combined CNR. The present invention can be implemented in the headend facility 105 with a suitable number of input ports depending upon the number of RORUs 165 and associated output ports based upon the number of return frequency bands to be processed by the BMC 305. In most applications, the BMC 305 is targeted to the application devices that are more susceptible to noise signals or would benefit by the improved CNR performance at the application device input. Additionally, the BMC 305 can be used in conjunction with the existing passive combiner 170 for application devices that are less susceptible to noise signals.

What is claimed is:

1. A method for transmitting at least one reverse signal having at least one burst mode carrier signal, the method comprising the steps of:
   filtering a plurality of reverse signals with a plurality of filters, each filter for providing a filtered reverse signal;
   digitizing each of the filtered reverse signals to provide a digitized signal;
   buffering each of the digitized signals to provide a delayed digital signal;
   detecting for the presence of at least one burst-mode carrier signal included in each filtered reverse signal;
   converting the delayed digital signal back to an analog signal;
   transmitting the analog signal including the detected presence of the at least one burst-mode carrier signal upon detection of the at least one burst-mode carrier signal; and
   whereby only transmitting the analog signals including the detected presence of the at least one burst-mode carrier signal prohibits the transmission of excess noise signals.

2. A burst-mode combiner, comprising:
   a plurality of burst-mode combiner circuits each for receiving reverse signals and for detecting the presence of at least one carrier signal included within the reverse signals,
   wherein each of the plurality of burst-mode combiner circuits allows transmission of the reverse signals depending upon the presence of the at least one carrier signal, and wherein each of the plurality of burst-mode combiner circuits comprise:
   a plurality of filters each for filtering the reverse signals depending upon a predetermined frequency band;
   an analog-to-digital (A/D) converter coupled to each filter for digitizing the filtered reverse signals;
   a buffer coupled to each A/D converter for delaying the digital reverse signals;
   a carrier detect circuit coupled to each A/D converter for detecting the presence of the at least one carrier signal, wherein upon detection of the at least one carrier signal, the carrier detect circuit controls the buffer to release the digital reverse signals; and
   a digital-to-analog (D/A) converter coupled to each buffer for converting the digital reverse signals back to analog reverse signals to produce gated reverse signals; and
   a combiner for combining the gated reverse signals from each of the plurality of burst-mode combiner circuits and providing the combined gated reverse signals to an application device.

3. In a broadband communications system including a headend facility and a distribution network, the headend facility for transmitting forward signals and for receiving reverse signals, the reverse signals including burst-mode carrier signals and noise signals, the broadband communications system comprising:
   a burst-mode combiner for combining the reverse signals received from a plurality of reverse receivers and for providing gated reverse signals including at least one carrier signal, the burst-mode combiner comprising:
   a plurality of burst-mode combiner circuits each coupled to a reverse receiver, each of the plurality of burst-mode combiner circuits for detecting the presence of the at least one carrier signal, each burst mode combiner circuit comprising:
   a plurality of filters each for filtering the reverse signals depending upon a predetermined frequency band;
   an analog-to-digital (A/D) converter coupled to each filter for digitizing the filtered reverse signals;
   a buffer coupled to each A/D converter for delaying the digital reverse signals;
   a digital-to-analog (D/A) converter coupled to each buffer for converting the digital reverse signals back to analog reverse signals;
   a switch coupled to the D/A converter; and
   a carrier detect circuit coupled to each A/D converter for detecting the presence of the at least one carrier signal, wherein upon detection of the at least one carrier signal, the carrier detect circuit controls the switch to release the analog reverse signals to provide the gated reverse signals; and
   a plurality of combiners, each combiner coupled to the plurality of burst-mode combiner circuits for receiving and for combining the gated reverse signals depending upon the predetermined frequency band.

4. The broadband communications system of claim 3, wherein for each burst-mode combiner circuit that is coupled to one reverse receiver each of the plurality of filters are tuned to a different frequency band, and wherein for each reverse receiver each of the plurality of burst-mode combiner circuits comprise like filters.

5. The broadband communications system of claim 4, wherein a plurality of combiners is associated with the like filters for each burst-mode combiner circuit, and wherein the plurality of combiners combine the gated reverse signals with associated frequency bands into a single reverse signal.

* * * * *